July 19, 1966 R. L. FABER ETAL 3,261,654
FILM FEEDING MECHANISM
Filed June 2, 1964 2 Sheets-Sheet 1

BION W. McCLELLAN
RICHARD L. FABER
INVENTORS

BY R. Frank Smith

ATTORNEYS

BION W. McCLELLAN
RICHARD L. FABER
INVENTORS
ATTORNEYS

3,261,654
FILM FEEDING MECHANISM
Richard L. Faber and Bion W. McClellan, Rochester, N.Y., assignors to Eastman Kodak Company, Rochester, N.Y., a corporation of New Jersey
Filed June 2, 1964, Ser. No. 371,938
12 Claims. (Cl. 352—194)

The present invention relates to an intermittent pull-down mechanism for motion picture apparatus, and particularly to an intermittent pull-down mechanism for motion picture projectors by the use of which fast motion, normal motion, slow motion and still projection can be achieved during both forward and reverse operation of the projector without significant loss of light or increase in flicker. The mechanism also provides for reverse projection at any rate of motion, as well as still projection, without stopping the shutter or the prime mover of the projector.

The present invention relates to an improvement in the intermittent pull-down mechanism for motion picture projectors disclosed in copending patent application Serial No. 215,698, filed August 8, 1962, in the names of R. J. Roman and V. J. Witkowski, issued as Patent No. 3,212,840 on October 19, 1965, both the present and the noted patent application being owned by the same assignee.

In building a skip-rate pull-down mechanism such as disclosed in the noted patent application Serial No. 215,698, considerable difficulty has been experienced when attempting to accurately position the in-and-out follower on the face of the variable in-and-out cam because the follower is positioned by a pivoted lever which cannot adjust the follower truly radially of the in-and-out cam and there is no way of accurately detenting the adjusting arm in its different positions. Minute angular misalignments have been found to cause intolerable timing errors between the in-and-out and pull-down cams, and slight variations may cause the in-and-out follower to ride its cam at the improper skip-rate position or in a dynamically unstable operating condition.

The present invention solves the above-mentioned problem found in the mechanism shown in the noted copending application by positioning and detenting the lever which carries the in-and-out follower directly on the in-and-out cam assembly so that it is adjusted in a straight line radially of the in-and-out cam and is positively detented accurately in each of its positions of adjustment. In this manner all variations and tolerances can be made to have the minimum possible effect on the follower timing and location.

Furthermore, while the above-noted patent application shows a film feeding mechanism for projectors which can be readily reversed without stopping the drive mechanism of the projector, the reversing was done by a control lever separate from the control lever which changes the rate of film advance and, as a result, it is possible to damage the mechanism or film if these two operations are not properly synchronized or carried out in the right sequence. For example, in order to prevent damage to the film and/or drive mechanism it is desirable, if not imperative, that any reversing of the film feed be accomplished only when the film claw is not in engagement with the film or, at least, when the film pull-down is operating at a slow speed. With the mechanism shown in the noted pending application this would mean that the operator would have to remember to shift the speed lever to its "still" position, or a position giving a slow rate of film pull-down, before he operates the reverse control lever.

The present invention solves the above-mentioned problem by modifying the reversing mechanism so that it can be associated with, and be operated by, the speed control member and in such a way that before the film advancing mechanism can be reversed the rate of pull-down must be slowed down, and preferably stopped, at the time a reverse of the mechanism is effected.

The primary object of the present invention is to provide an improved variable rate pull-down mechanism for motion picture projectors of the type shown in copending application Serial No. 215,698, in which the shift lever which carries the in-and-out follower is mounted to move strictly radially of the in-and-out cam and is detented in each of its different positions of adjustment.

A further object is to provide an improved variable rate pull-down mechanism of the type described in which the lever for adjusting the in-and-out follower as well as the detenting means therefor are both positioned on the in-and-out cam assembly.

Another object is to provide an improved variable rate pull-down of the type in question which can be reversed while the mechanism is in operation and in which the reversing mechanism and speed control mechanism are arranged to be controlled by one and the same control member so that the speed of pull-down must be reduced to a safe value before the mechanism can be reversed.

And yet another object is to provide a pull-down mechanism of the type described in which the connection between the control knob and each of the reversing mechanism and the rate changing mechanism is such that the pull-down claw can be reversed only at a time when the claw is out of engagement with the film, and preferably when the film advancing mechanism is adjusted for "still" projection.

The novel features that we consider characteristic of our invention are set forth with particularity in the appended claims. The invention itself, however, both as to its organization and its methods of operation, together with additional objects and advantages thereof, will best be understood from the following description when read in connection with the accompanying drawings in which:

Figure 1:
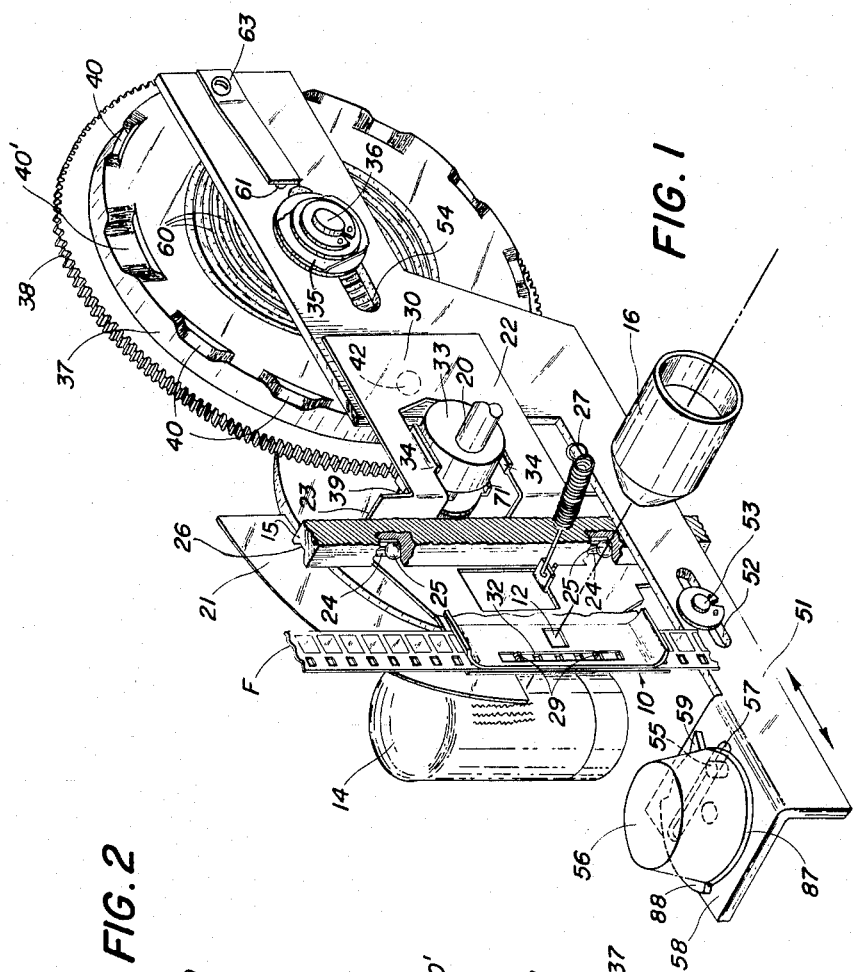
FIG. 1 is a perspective view showing an intermittent pull-down mechanism for a motion picture projector constructed in accordance with a preferred embodiment of the present invention.
Figure 4:
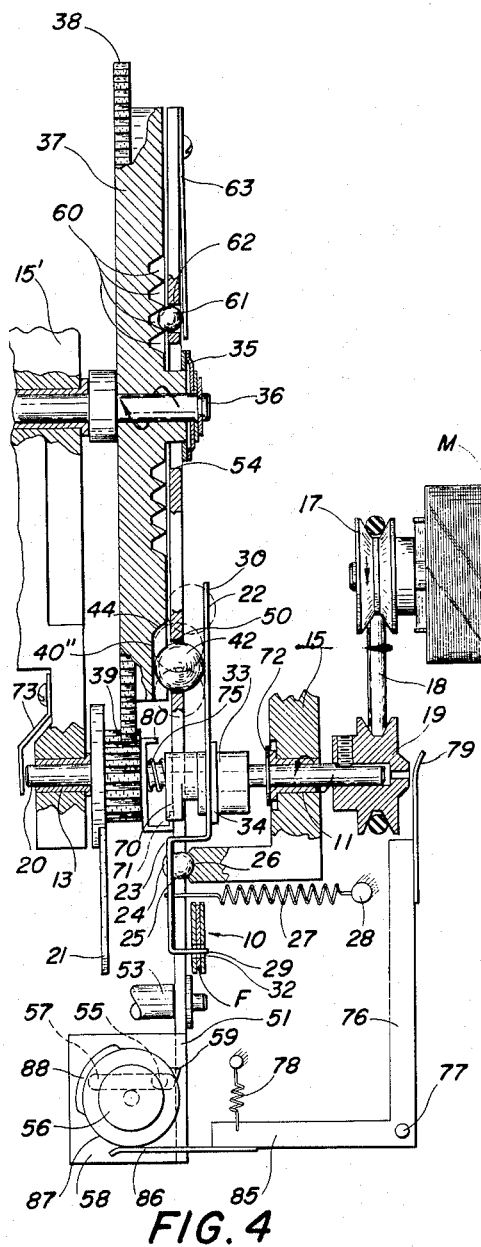
Figure 5:
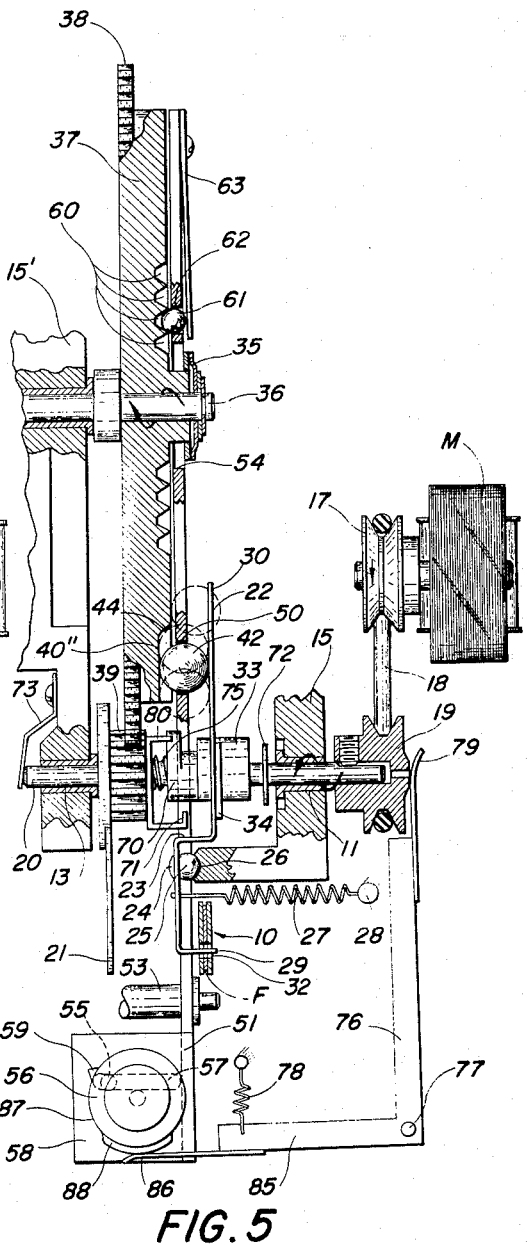

FIG. 4 is a horizontal sectional view taken substantially through the axis of the face cam in FIG. 1 and showing parts of the drive means for the shutter shaft not shown in FIG. 1. In this view the parts of the drive mechanism are shown in the position they assume when adjusted for a forward operation of the projector and with the rate adjusting mechanism set to a position for projecting a film at 18 frames per second, and FIG. 5 is a view similar to FIG. 4 but with the mechanism adjusted for reverse operation at 18 frames per second.

Referring now to the drawings, for purposes of clarity and simplification we have shown only those parts of a motion picture projector which are essential to an understanding of the present invention. These parts include an apertured film gate 10 the aperture 12 of which is illuminated by a lamp 14 located behind the gate. A perforated motion picture film F is adapted to be moved through the gate by an improved pull-down mechanism which will be described hereinafter, and as each frame of the film is moved into alignment with the aperture in the gate and is illuminated by the lamp it is projected by a lens 16 onto a screen, not shown.

The prime mover of the projector comprises an electric motor M to the drive shaft of which is fastened a drive pulley 17. This pulley is connected by a belt 18 to a driven pulley 19 fixed to the end of the main drive shaft 20 which lies to one side of, and extends substantially parallel to, the optical axis of the projector. Drive shaft 20 is rotatably and slidably mounted in bearings 11 and 13 mounted in supporting walls 15 and 15' forming parts of the projector. The reason for slidably mounting the drive shaft in bearings 11 and 13 will be pointed out below. Under normal load conditions the motor shaft will operate at approximately 3240 r.p.m., or 54 cycles per second, which is the operating speed of certain commercially available motors, and the pulley and belt combination is so chosen that this same frequency of rotation is transmitted to the drive shaft 20. The light beam is cut off from the projection aperture of the gate by a rotating sector shutter 21 drivingly connected to the drive shaft 20 in a manner hereinafter described. Since this shutter has but a single cut-off blade it will intercept the light beam at 54 cycles per second and then only at the time the film is being moved through the gate, as is well known in the art.

Coming now to the intermittent film feeding mechanism, this includes a rigid claw arm 22 extending laterally of the film to be fed and having an offset portion 23 intermediate its two ends. This claw arm is mounted to move up and down and pivot relative to the film gate by having a pair of vertically spaced ball seats 24 formed in the forward face thereof rotatably seating a pair of spaced ball bearings 25 which are in turn rotatably positioned in a vertical ball race 26 formed in one edge of the forward wall 15 of the projector. The claw arm is held in assembled relation on the ball bearings 25 by a spring 27 one end of which is attached to the claw arm on the side of the pivot point nearest the gate and the other end of which is attached to a pin 28 fixed to the projector. This spring, in addition to holding the claw in assembled relation with its ball mountings, also acts to bias one or more film engaging claws 29 on one end of the arm toward the gate and into a film engaging position. In addition this spring 27 also acts to force the other end 30 of the claw arm against a ball 42 which acts as a follower engaging the in-and-out cam as will be more fully described hereinafter. As is well known, the claw arm will reciprocate up and down on the ball bearings 25 to effect the film advance and will pivot about these ball bearings to move the claw teeth 29 into and out of engagement with the film, the gate being provided with an elongated slot 32 to accommodate the pull-down claws and allow the up and down movement of the claw while the teeth 29 are in engagement with the film.

In the arrangement shown, the up and down reciprocal movement of the claw arm edgewise for feeding the film is under the control of an up and down or pull-down cam 33 fixed to the drive shaft 20, which cam is embraced by a pair of followers 34 fixed to the claw arm and extending substantially at right angles to the vertical ball race 26. Since each revolution of the up and down cam produces one complete reciprocal stroke of the film claw, and the drive shaft is rotating at 54 r.p.s., it follows that the claw will be reciprocated at a rate of 54 strokes per second.

The in-and-out movement of the pull-down claw relative to the film gate is produced by a novel skip-stroke mechanism which will now be described. Fixed to a shaft 36 rotatably mounted in the wall 15' of the projector and in substantially parallel relation with drive shaft 20 is a wheel or face cam 37 fixed to or carrying a gear 38. Gear 38 is driven by a pinion 39 which is rotatably and slidably mounted on the drive shaft 20 and is selectively clutched thereto in a manner to be fully described hereinafter. The shutter 21 is fixed to this pinion to rotate therewith.

The other, or forwardly directed, face, of the face cam 37 is provided with a plurality of depressions 40, 40' and 40" which are spaced circumferentially about the face of cam 37 and have their leading and trailing edges tapered into the surface of the cam so that a follower pressed against the face of the cam can move into and out of the depressions as the cam rotates. These depressions, therefore, constitute cam surfaces which in combination with the face of the cam 37 form a series of concentric in-and-out cams whose profiles control the in-and-out movement of the claw. Depressions 40' are twice as wide in a radial direction of the face cam as depressions 40, while depression 40" is three times as wide as depression 40 in the same sense. Accordingly, starting at the outside of the face cam, and moving radially inwardly thereof, we have a series of concentrically arranged in-and-out cams comprising first an outer group of nine depressions separated by nine high areas of substantially the same arcuate length as the depressions, then a group of three depressions separated by three high areas having an arcuate length substantially three times that of the depressions, then a group consisting of one depression, and finally a concentric circle in which there are no depressions. This arrangement of cam surfaces provides a multiple in-and-out cam by means of which the skip-rate of the in-and-out movement of the claw can be changed relative to the pull-down stroke to vary the rate by which the film is advanced through the gate by merely moving the ball follower 42 radially of the face cam and into alignment with different ones of said concentric, and circular cam surfaces. In-and-out movement is transmitted to the claw from the in-and-out cams by the ball follower 42 which is pressed against the face of the in-and-out cam 37 by the follower end 30 of the claw arm which is loaded in this direction by the action of spring 27 biasing the claw into engagement with the film. It will thus be seen that spring 27 in addition to forcing the ball follower into engagement with the in-and-out cam also serves to hold the ball follower in assembled relation. The depressed cam surfaces 40, 40' and 40" are of such depth that when the ball follower drops into one of the same the spring 27 can pivot the claw arm far enough to engage the claw teeth 29 with the film preforations. On the other hand, when the ball follower 42 rides out of a depression and onto the surface of the face cam between depressions the claw arm will be pivoted against the action of spring 27 by a sufficient amount to withdraw the claw teeth from the film path. Accordingly, each circular series of depressed cam surfaces in combination with the face surface of the cam therebetween will constitute a circular in-and-out cam for controlling the movement of the claw teeth 29 to and from the film path of the gate. While the innermost circle of the in-and-out cam described has no depressed cam surfaces, the face surface of the cam causes the claw to be held out of engagement with the film for the projection of "stills" and in reality constitutes an in-and-out cam despite the fact it possesses no depressed cam surfaces. Should it be found desirable or necessary to maintain the extent of the in-and-out movement of the claw teeth the same in each position of the ball follower 42 radially of the in-and-out cam 37, then the depth of the depressed cam surfaces of each circular group can be different from those of the other groups to account for the change in the throw of the claw arm occasioned by altering the length of the lever arm as the ball follower is shifted radially of the in-and-out cam relative to the pivot point of the arm as the projection rates are changed.

The reduction ratio between pinion 39 and gear 38 on the face cam is nine to one (9:1). Since there are nine depressed cam surfaces on the outer circular group of the face cam, when the ball follower is positioned radially of the face cam to engage this group it will produce an in-and-out stroke of the claw for each revolution of the up and down cam 33. This means that the film F will be pulled down one frame per revolution of the cam 33 or at a rate of 54 frames per second. When the ball follower 42 is moved radially inward of the face cam to engage the next circular group of depressed cam surfaces, or that circle containing the three depressed cam surfaces 40′, the claw will be moved in-and-out once for every three revolutions of the up and down cam 33 and the film will be advanced at a rate of 18 frames per second. When the follower ball is moved inwardly to the circle containing the one cam surface 40″ it produces one in-and-out stroke of the claw for every nine revolutions of the up and down cam 33 and advances the film at a rate of six frames per second.

If the ball follower 42 is moved in on the face cam to a position where there are no depressed cam surfaces there will be no in-and-out movement of the claw but the claw teeth will be held out of engagement with the film by the face surface of the cam. This position of the ball follower will produce a desirable condition for still projection in which the shutter continues to run at 54 frames per second. It is also pointed out that for all three film speeds described, as well as during still projection, the rate at which the light beam is interrupted by the shutter, and hence the flicker effect, remains constant at 54 interruptions per second. Furthermore, the amount of light transmitted remains constant and independent of the rate of projection.

Figure 2:
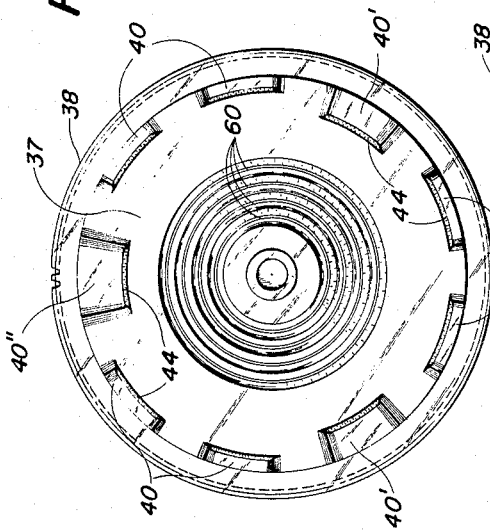
FIG. 2 is a front elevational view of the in-and-out face cam which provides the in-and-out movements of the film claw.
Figure 3:
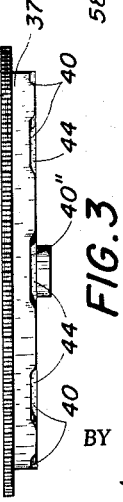
FIG. 3 is a side elevational view of the in-and-out cam shown in FIG. 2, and looking down from the top thereof as viewed in FIG. 2.

As will be noted in FIGS. 2 and 3, the arcuate wall 44 of each of the depressed surfaces 40, 40′ and 40″ is inclined to allow the ball follower 42 to be shifted radially of the face cam from one group of cam surfaces to the next concentric group without stopping the mechanism even if the shift is undertaken at the time the ball follower 42 is in engagement with one of the depressed cam surfaces. This allows an instant change of frame rate which is highly desirable. In addition, there is little difference in mechanism noise between the fast and slow film speeds.

It is imperative to accurately position the ball follower 42 at the different radial positions on the face of the in-and-out cam in order to avoid minute angular misalignments which will cause intolerable timing errors between the in-and-out and pull-down cams and in order to avoid slight radial variations which may cause the in-and-out follower to ride on the in-and-out cam at the improper skip-rate position or in a dynamically unstable operating condition. This invention solves this above-mentioned problem by positioning and detenting the lever which controls the position of the ball follower directly on the in-and-out cam assembly. In this manner all variations and tolerances can be made to have the minimum possible effect on the follower timing and location.

To this end, the ball follower 42 is captured in an aperture 50 in the end of a shift lever 51 which extends in parallel spaced relation to the face cam 37 and is suspended at one end by an elongated slot 52 therein engaging a pin 53 fixed to the projector and is suspended at the other end by an elongated slot 54 therein engaging the hub of the face cam 37. The shift lever 51 is held flat against the face of the in-and-out cam 37 by the presence of a spring washer 35 which is backed up by a retaining ring fastened to the cam shaft 36. The lever is thus held parallel to the plane of rotation of the in-and-out cam. The shift lever 51 is offset as shown clearly in FIG. 1 to pass below the optical axis of the projector, and the ball follower 42 is located in line with the axis of the face cam so that as the shift lever is adjusted back and forth as indicated by the double ended arrow in FIG. 1 for varying the rate of film advance the ball follower will be moved accurately radially of the face cam. It might be pointed out that while the width of the aperture 50 capturing the ball follower is slightly larger than the diameter of said ball so to allow the ball to move freely transversely of the lever in response to the in-and-out cam 37, the width of the aperture should be maintained as small as possible so that there will be no lost motion between the shift lever 51 and the ball follower 42 when the shift lever is adjusted to change the rate of projection. While we have shown the in-and-out follower as a ball, it goes without saying that it could be a pin with a rounded end engaging the face cam and with a flat or rounded end engaging the follower end 30 of the claw arm 22.

The shift lever 51 may be pushed back and forth in the direction of the double arrow shown in FIG. 1 by the eccentric pin 55 on the control knob 56 engaging an elongated slot 57 in a turned-over end 58 on the end of the shift lever 51. The control knob 56 will be oscillatedly mounted on a control panel, not shown, of the projector and a pointer 59 thereon can co-operate with a speed scale calibrated in rates of 54, 18, 6, 0, 6, 18, and 54 frames per second. In the position of the control knob shown in the drawings, the shaft lever 51 is positioning the ball follower 42 in the position where the ball is shown in solid lines and in which position it engages the second group of three cam surfaces 40′ on the face cam so that the claw teeth will be moved into and out of engagement of the film at the rate of 18 frames per second. If the control knob 56 were rotated counterclockwise from the position shown, it would first move the shift lever 51 inwardly of the face cam to a position giving a rate of film advance of six frames per second and then to the innermost position on the face cam in which the ball follower 42 would engage that circular portion of the cam having no depressed cam surfaces and in which position the claw would be held out of engagement with the film and "still" projection would result. The different positions of which the ball follower 42 is capable radially of the face cam are illustrated in FIGS. 4 and 5 by dotted lines. The control knob 56 is capable to a movement slightly greater than 180° and in going from one limit of this movement to the other shifts the ball follower 42 from the position where it engages the outermost group of cam surfaces on the face cam (54 frames per second) to its innermost position on the face cam (still projection) and then out again on the cam surface to the 54 frame per second position.

When the shift lever 51 is moved in the direction of the double arrow shown in FIG. 1, the radial position of the ball follower 42 on the in-and-out cam is determined by the radial position of the four concentric skip-frame detent grooves 60 in the face of the cam 37 into which the detent ball 61 captured in an aperture 62 in the shift lever is forced to drop by the detent spring 63. Thus the radial position of the ball follower 42 is determined as accurately as it is possible to mold, or otherwise form, the relative positions of the detent grooves 60 to the skip-rate in-and-out cam tracks on the face of the in-and-out cam. Each of the circular grooves of in-and-out cam surfaces making up a cam track, as well as a circular track on the face of a cam which has no cam depressions, has a corresponding detent groove 60. A pleasant, positive detent action is imparted to the control knob 56 by the action of the detent ball 61.

The variable in-and-out pull-down mechanism described up to this part can feed film at rates of 54, 18, 6 or 0 frames per second with substantially instant shift from one rate to another without stopping the up and down movement of the film claw. This means that the film is traveling through the projector at 8.1, 2.7, 0.9 or 0 inches per second. With a sprocketless projector of the well known type, e.g. where the film is pulled directly from the film supply reel and fed to the take-up reel by the action of the pull-down claw, this difference in film rate is absorbed easily by the take-up and supply reels which are generally tendency driven. If this pull-down system were used on a sprocket-type projector, however, means would have to be provided to alter the sprocket feed rate in exact synchronism with the change in rate of the claw pull-down mechanism in order to avoid a loss of the film loop ahead of and/or beyond the film claw. This could involve such a complicated and expensive sprocket driving mechanism as to possibly take such a projector out of the price range of amature projection equipment.

While we have mentioned certain rates of projection in describing our invention, it will be appreciated that more or less speed changes could be provided without going beyond the scope of the present invention. Likewise, while we have shown an arrangement of parts by means of which the desired change in frequency between the up and down and the in-and-out movements of the claw can be achieved almost instantly while the prime mover is operated at one speed, it is pointed out that the present invention is not limited to the particular arrangement of parts disclosed to accomplish this end, but is intended to include all arrangements coming within the scope of the appended claims.

In order to achieve reverse projection with this variable rate pull-down system without having to stop or reverse the direction of the motor of the drive shaft 20, an arrangement of parts has been devised for reorienting the up and down cam 33 from its original position relative to the in-and-out cam 37. When this is done, the in-and-out cam which has previously been forcing the claw into the film path just prior to the start of the down stroke and withdrawing it from the film path at the end of the down stroke, will now force the claw into the film path just prior to the beginning of the up stroke and will draw it out of the film path at the completion of the up stroke of claw. While it is desirable to change the rate of film advance when the projector is operating in reverse as well as in a forward direction, it is not desirable that it be possible for the projector to be reversed while operating at high speed because the mechanism and/or film might be damaged. Accordingly, we have devised a mechanism by which the projector may be reversed and which mechanism is combined with the rate changing knob so that the projector can only be reversed when the film claw is disengaged from the film.

To this end, and referring to FIGS. 4 and 5, the drive shaft 20, which is always driven in the direction indicated by the arrow, is slidably mounted in bearings 11 and 13, pull-down cam 33 is fixed thereto, and pinion 39 is rotatably and slidably mounted thereon as described above. When the projector is operating in a forward direction, see FIG. 4, a driving dog 70 on the pull-down cam 33 drives the forward driving dog 71 on the pinion 39. The pinion in turn drives the in-and-out cam 37 which controls the axial movement of the ball follower 42 as described above. The single bladed shutter is fixed to the pinion 39 and is so timed relative to the forward dog 71 that it covers the gate aperture during the forward indexing stroke of the claw. Retaining ring 72 fixed to the drive shaft 20 is forced against the bearing 11 by the shifting spring 73, thus establishing the axial position of the pull-down cam 33 and the driving dog 70 fixed thereto. A light coil spring 75 encircling the drive shaft 20 ensures the pinion 13 and the shutter 21 fixed thereto always being located against the face of the other bearing 13. If desired, spring 75 may be made heavy enough to take over the job of shifting spring 73, in which case spring 73 may be eliminated. Shifting lever 76 which pivots about a stationary pivot 77 on the projector is normally biased in a clockwise direction by a spring 78 so that the end of a finger 79 integral therewith does not contact the face of the pulley 19 when the mechanism is set for forward projection, see FIG. 4.

To reverse the projector the shift lever 76 is pivoted counterclockwise about its pivot 77 to cause the end of finger 79 to engage the face of the pulley 19 and shift the drive shaft 20 axially to the left and into the position shown in FIG. 5. In this position of the drive shaft 20 the driving dog 70 on the pull-down cam 33 slips off the forward driving dog 71 on the pinion 39. As a result pinion 39 slips back precisely 180° until its reverse driving dog 80 comes into engagement with the driving dog 70 on the pull-down cam 33 and continues to operate in this position. Shifting spring 73 and coil spring 75, if both are used, are deflected or compressed by the axial movement of the drive shaft 20 to this reverse position.

In order to tie the reversing of the projector into the change of speed thereof so that the rate of projection can be varied during both directions of operation but the mechanism cannot be reversed except when the film claw is disengaged from the film, the reverse of the projector is made dependent upon rotation of the control knob 56 as will now be described. The end 85 of shift lever 76 has fixed thereto a follower 86 which is held by spring 78 against the periphery of a cam 87 fixed to the control knob 56 for rotation thereby. The cam 87 includes an arcuate lobe 88 which has a rise which will cause the shift lever 76 to be pivoted counterclockwise to reverse the projector when the lobe is moved into engagement with the follower 86. The lobe 88 is so positioned on the control knob 56 relative to the eccentric pin 55 thereon that it will not engage follower 86 to reverse the projector except when the control knob is in a position to have shifted the ball follower 42 radially of the in-and-out cam to a position where the claw is held out of the film and the film speed is stopped. In other words the projector can be reversed only when the rate control knob is in a position to give a "still" projection. The lobe 88 is of such arcuate length that after the control knob is moved counterclockwise from the position shown in FIG. 4 and through the "still" position it will hold the mechanism in the reversed condition while the control knob is rotated further in a counterclockwise direction to produce the full range of rate variations of which the mechanism is possible, see FIG. 5. Therefore, both the direction and speed of projection will be determined by the setting of the control knob 56 in such a way as to insure that these two operations can occur in only the proper sequence.

While we have shown this reversing mechanism in combination with our new variable rate pull-down system it is pointed out, and it will be appreciated by those skilled in the art, that this reversing mechanism could be used in combination with any conventional pull-down mechanism capable of only one rate of projection or a mechanism having no provision for projecting "stills."

Although we have shown and described certain specific embodiments of our invention we are fully aware that many modifications thereof are possible, and our invention, therefore, is not to be restricted to the precise details of construction shown and described but is intended to cover all modifications coming within the scope of the appended claims.

We claim:

1. A motion picture projector comprising in combination:
    (a) a gate having a projection aperture and through which gate a motion picture film is adapted to be intermittently advanced past the aperture therein for the projection of successive image frames thereon;
    (b) a film claw;
    (c) means for mounting said claw for in-and-out and up and down movements relative to said gate during which movements it intermittently engages and advances the film through said gate;
    (d) drive means operating at a given frequency;
    (e) an up and down cam connected to said drive means for driving said claw up and down relative to said gate at said given frequency;
    (f) means for imparting in-and-out movements to said claw in different time relations with said up and down movement thereof including,
        (1) a face cam rotatably mounted on an axis substantially parallel to the optical axis of said apertured gate, (2) a plurality of in-and-out cam surfaces located on the face of said cam and arranged in groups of different numbers with the cam surfaces of each group circumferentially arranged in circles concentric to the axis of said cam, (g) means for rotating said face cam in synchronism with said up and down cam;

(h) a cam follower extending between said face cam and said claw to cause said claw to move into and out of engagement with said film in response to rotation of said face cam;

(j) means for selectively shifting said cam follower radially of said cam face between different predetermined positions and in each of which it lies in the path of different ones of said groups of cam surfaces while maintaining the connection between the follower and said claw to change the rate of film advance, and (k) and means on said face cam and carried by said cam follower shifting means cooperating to accurately and positively locate said follower shifting means in different ones of said predetermined positions.

2. A motion picture projector according to claim 1 in which said last-mentioned means includes (1) a plurality of concentric grooves in the face of said face cam and radially spaced from each other by an amount corresponding to the radial spacing of said groups of in-and-out cam surfaces, and (2) a spring loaded ball carried by said cam follower shifting means and moved to and from engagement with different ones of said grooves as said follower shifting means is moved radially of said face cam between said predetermined positions.

3. A motion picture projector comprising in combination:

(a) a gate having a projection aperture and through which gate a motion picture film is adapted to be intermittently advanced past the aperture therein for the projection of successive image frames thereon;

(b) a film claw;

(c) means for mounting said claw for in-and-out and up and down movements relative to said gate during which movements it intermittently engages and advances the film through said gate;

(d) drive means operating at a given frequency;

(e) an up and down cam connected to said drive means to drive said claw up and down relative to said gate at said given frequency;

(f) means for imparting in-and-out movements to said claw in different time relations with said up and down movement thereof including, (1) a face cam rotatably mounted on an axis substantially parallel to the optical axis of said apertured gate, (2) a plurality of in-and-out cam curfaces located on the face of said cam and arranged in groups of different numbers with the cam surfaces of each group circumferentially arranged in circles concentric to the axis of said cam, (g) means for rotating said face cam in synchronism with said up and down cam;

(h) a cam follower extending between said face cam and said claw to cause said claw to move into and out of engagement with said film in response to rotation of said face cam;

(j) means for selectively shifting said cam follower radially of said cam face between different positions in each of which it lies in the path of different ones of said groups of in-and-out cam surfaces while maintaining the connection between the follower and said claw to change the rate of film advance and including (1) a follower shift lever movable substantially radially of said face cam, and (2) a speed control knob movably mounted on said projector in co-operation with a speed scale connected to said follower shift lever to move it and the follower relative to said face cam.

4. A motion picture projector according to claim 3, in which said cam follower comprises a member having a dimension axially of said face cam greater than the thickness of said shift lever so that it extends beyond both sides of said lever, and the surface of said member engaging said face cam being substantially spherical, said shift lever provided with an aperture confining said member so as to permit it to move relative to said lever axially of said face cam but causing it to be shifted radially of said face cam as said shift lever is moved, and said follower member confined axially of said aperture and biased into engagement with said face cam by said film claw.

5. A motion picture projector according to claim 4 in which said film claw comprises (1) an enlongated arm extending transversely of and substantially parallel to said film gate, (2) a film engaging tooth on one end of said arm and extending substantially at right angles thereto, (3) the other end of said arm arranged to engage said cam follower, and in which said claw mounting means comprises (a) a ball race located to one side of said gate and extending substantially parallel to the path of the film moving through said gate, (b) at least two balls rotatably mounted in spaced relation in said ball race and together defining a reciprocal as well as pivotal support for the intermediate portion of said arm, and (c) a spring means acting on said claw arm to hold the intermediate portion thereof in assembled relation with said balls wherein the intermediate portion of the arm rides on the periphery thereof and biasing said claw arm to pivot about said balls in a direction to hold said other end of said claw arm in engagement with said cam follower.

6. A motion picture projector comprising in combination:

(a) an apertured film gate through which a motion picture film is adapted to be intermittently advanced for the projection of successive image frames thereon, (b) a film claw, (c) means for mounting said claw for up and down and in-and-out movements relative to said gate during which movements it intermittently engages and advances the film through said gate, (d) drive means operating at a given frequency, (e) an up and down cam connected to said drive means to drive said claw up and down relative to said gate at said given frequency, (f) means for selectively imparting in-and-out movements to said claw in different time relations with said up and down movement thereof to change the rate of film advance and for selectively holding said claw out of engagement with said film for the still projection of a given frame of the film, and including, (1) an in-and-out cam driven in synchronism with said up and down cam and having a plurality of cam surfaces spaced along a surface thereof, certain of which cam surfaces control the rate of the in-and-out movement of the claw and one of which cam surfaces holds the claw out of engagement with said film for the still projection of an image frame of said film, (2) a cam follower connecting said claw to said in-and-out cam to cause said claw to move into and out of engagement with said film in response to rotation of said cam and in accordance with the particular cam surface engaged thereby, (3) means for adjusting said cam follower along said in-and-out cam to engage selected ones of said cam surfaces, (g) means for selectively shifting the phase relation between said up and down cam and said in-and-out cam by 180° to reverse the direction of movement of the film through said gate without stopping said drive means, and (h) a common control member connected to said means for selectively changing the rate of film advance and said means for selectively reversing the direction of movement of said film so that both the rate of projection and the direction of film movement is controllable by adjustment of said common control member.

7. A motion picture projector according to claim 6, in which the connection between said control member and said rate changing means and said reversing means necessitates the rate changing means assuming a position effecting still projection wherein the claw is removed from said gate at the time a reverse of the film advanced is effected thereby.

8. A motion picture projector according to claim 6, in which said selective rate changing means and said selective phase shifting means and the connection between each of these means and said common control member is such that an oscillation of said control member between two limits first reduces the rate of projection from a maximum equal to the frequency of said drive means in predetermined stages until still projection is achieved when said control member reaches an intermediate position of adjustment and after which further movement of the control member then increases the rate of projection in predetermined stages until the maximum rate is again achieved when the control member reaches said other limit, said control member effecting reverse of said film movement as it moves through said intermediate position, whereby the reverse of the film can be accomplished only when the film is motionless and the rate of projection can be changed during both the forward and reverse operation of the projector.

9. A motion picture projector according to claim 6 in which said means for shifting the phase relation between said up and down and in-and-out cams by 180° to reverse the direction of film movement includes (1) a slidably mounted drive shaft forming a part of said drive means to move between a first position and a second position in one of which it causes the film to move forwardly and in the other of which it causes the film to move in reverse, (2) a shiftable lever connected to said drive shaft to move said drive shaft between said two positions, and in which said means for adjusting said cam follower along said in-and-out cam to engage selected ones of said cam surfaces to change the rate and characteristic of the in-and-out movement of said claw includes, (a) a follower shifting bar oscillatable between two limits and in one of which the follower engages a cam surface which causes the claw to move in-and-out of engagement with the film at a frequency equal to said given frequency at which said drive means is operating, and in the other of which the follower engages a cam surface which holds the claw out of engagement with the film for the projection of stills, and in which said common control member and its connection with said means for selectively changing the rate of film advance and said means for selectively reversing the direction of movement of said film includes, (1a) a control member oscillatable between two positions during which it passes through an intermediate position, and (2a) means connecting said control member and said follower shifting bar for shifting said bar from its one limit to its other limit and back to said one limit as said control member moves from one of its two positions to said intermediate position and then onto its other position, and (3a) means for connecting said control member and said shiftable lever for shifting said lever to move said drive shaft from one of its two positions to the other at the time said control member is moved to its intermediate position, whereby said film advance is reversed during the time said claw is disengaged from said film.

10. A motion picture projector comprising in combination:

(a) an apertured film gate through which a motion picture film is adapted to be intermittently advanced for the projection of successive image frames thereon, (b) a film claw, (c) means for mounting said claw for up and down and in-and-out movements relative to said gate and during which movements it intermittently engages and moves the film through said gate, (d) a rotatable pull-down cam for moving the claw through a complete up and down stroke on each revolution, (e) a rotatable in-and-out cam for producing in-and-out movements of the claw to effect engagement and disengagement of the claw with said film, (f) drive means for rotating said pull-down and in-and-out cams in timed relation, including, (1) a drive shaft, (g) means for selectively reversing the direction in which said claw moves said film through said gate without stopping said drive means, including (1) means for mounting said drive shaft to move axially between a first position, in which said pull down cam is connected to said in-and-out cam in a phase relationship such that the claw moves into engagement with the film at the top of the up and down stroke of said claw, and a second position, in which the phase relationship between the in-and-out cam and the pull down cam is shifted 180° relative to the relationship said cams have when said drive shaft is in said first position and wherein said claw enters the film at the bottom of the pull down stroke;

(h) and means for shifting said drive shaft axially between said first and second positions and including (1) an indexed control knob movable between two positions on a scale which designate a forward and a reverse projection condition, respectively.

11. A motion picture projector according to claim 10 in which said drive shaft is spring biased to said first position for forward projection of the film.

12. A motion picture projector according to claim 10 in which said drive means for rotating said pull down and in-and-out cams in timed relation and said means for selectively reversing the direction in which said claw moves said film through said gate without stopping said drive means, includes (a) a drive shaft axially movable between a first and a second position, (b) said pull down cam fixed to said drive shaft to rotate therewith, (c) means for driving said in-and-out cam, (d) a clutch means for connecting said drive shaft to said means for driving said in-and-out cam and shiftable between first and second positions in which the phase relation between said pull down and in-and-out cams is shifted by 180°, (e) and means for selectively moving said drive shaft axially while the same is rotating to shift said clutch between said first and second positions and reverse the direction of the film advance through said projector.

No references cited.

NORTON ANSHER, *Primary Examiner.*